US006957272B2

(12) United States Patent
Tallegas et al.

(10) Patent No.: US 6,957,272 B2
(45) Date of Patent: Oct. 18, 2005

(54) STACKABLE LOOKUP ENGINES

(75) Inventors: Mathieu Tallegas, Veradale, WA (US); Abdelkahim Safir, Spokane, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 938 days.

(21) Appl. No.: 09/764,943

(22) Filed: Jan. 18, 2001

(65) Prior Publication Data

US 2001/0037396 A1 Nov. 1, 2001

Related U.S. Application Data

(60) Provisional application No. 60/215,738, filed on Jun. 29, 2000, provisional application No. 60/206,996, filed on May 24, 2000, and provisional application No. 60/206,617, filed on May 24, 2000.

(51) Int. Cl.$^7$ .......................... G06F 15/173; H04L 12/28
(52) U.S. Cl. ........................ 709/238; 370/389; 370/392
(58) Field of Search ................................ 709/203, 232, 709/238, 245, 217, 219; 370/229–238, 351, 389, 356, 388, 392, 395.5, 399; 711/216, 217, 221; 707/2, 3, 6, 10

(56) References Cited

U.S. PATENT DOCUMENTS

| | | | | |
|---|---|---|---|---|
| 5,909,440 | A | * | 6/1999 | Ferguson et al. ........... 370/389 |
| 5,938,736 | A | * | 8/1999 | Muller et al. ............... 709/243 |
| 5,983,223 | A | | 11/1999 | Perlman |
| 6,006,306 | A | | 12/1999 | Haywood et al. ........... 711/108 |
| 6,161,144 | A | | 12/2000 | Michels et al. ............. 709/238 |
| 6,430,527 | B1 | * | 8/2002 | Waters et al. .................. 703/3 |
| 6,463,067 | B1 | * | 10/2002 | Hebb et al. ................. 370/413 |
| 6,493,347 | B2 | * | 12/2002 | Sindhu et al. .............. 370/401 |
| 6,553,000 | B1 | * | 4/2003 | Ganesh et al. .............. 370/235 |
| 6,658,015 | B1 | * | 12/2003 | Merchant et al. ........... 370/422 |
| 6,665,297 | B1 | * | 12/2003 | Hariguchi et al. .......... 370/392 |
| 6,678,269 | B1 | * | 1/2004 | Michels et al. ............. 370/389 |
| 6,687,715 | B2 | * | 2/2004 | Schroeder ................... 707/200 |
| 6,711,153 | B1 | * | 3/2004 | Hebb et al. ................. 370/351 |
| 2002/0012585 | A1 | * | 1/2002 | Kalkunte et al. ........... 415/137 |
| 2002/0093974 | A1 | * | 7/2002 | Kadambi et al. ........... 370/419 |

FOREIGN PATENT DOCUMENTS

| EP | 0899743 A | 3/1999 |
|---|---|---|
| WO | WO 98/12651 A | 3/1998 |

OTHER PUBLICATIONS

Moestedt et al. "IP Address Lookup in Hardware for High–Speed Routing," IEEE Hot Interconnects VI, , Stanford, CA USA, Aug. 1998, pp. 31–39.*

Waldvogel et al., "Scalable High Speed IP Routing Lookups." In Proc. of ACM SIGCOMM, Sep. 1997, pp. 25–36.*

Johnson, Howard W., Olympic Technology Group, Inc., "Fast Ethernet Dawn of a New Network," 1996, Prentice Hall PTR, New Jersey, whole book.

Safir, Abdelhakim, "Search Algorithms and IP Routing Lookup Implementation," Jan. 23, 2001, pp. 1–10.

Tanenbaum, Andrew S., Computer Networks, 1996,Third Edition Chapters 2–7, Prentice Hall PTR, New Jersey, Chapters 2–7.

* cited by examiner

*Primary Examiner*—Marc D. Thompson
*Assistant Examiner*—Yemane M. Gerezgiher
(74) *Attorney, Agent, or Firm*—Craig A. Boersten; V. Lawrence Sewell

(57) ABSTRACT

Multiple lookup engines stacked upon one another in a single data communication switch. The lookup engine at the top of the stack transmits its result to the neighboring downstream lookup engine which either validates and transmits the received result or its own result based on the quality of its match. The result preferably indicates an exact match, partial match, or no match. Although several lookup engines can return a partial match, an exact match preferably occurs in only one lookup engine. The comparison, validation, and transmission steps are repeated by each downstream lookup engine, with the lookup engine at the bottom of the stack validating and returning a final result to the packet processor. The returned final result reflects a search result with the highest match quality.

26 Claims, 5 Drawing Sheets

STACKABLE LOOKUP ENGINES

CROSS-REFERENCE TO RELATED APPLICATION(S)

This application claims the benefit of U.S. provisional applications 60/206,996 and 60/206,617, both filed on May 24, 2000, and U.S. provisional application 60/215,738 filed on Jun. 29, 2000, the contents of which are incorporated herein by reference.

FIELD OF THE INVENTION

This invention relates generally to communication networks, and more particularly, to address lookup engines used to route information through such networks.

BACKGROUND OF INVENTION

High-speed data communication nodes such as routers and switches communicate with each other by transmitting and receiving data packets via communication protocols such as HTTP, TCP/IP, SMB, and the like. When a node receives a data packet, it performs address lookups to properly process the packet. In performing an address lookup, a key including information from the packet is compared against entries in a lookup table. If a match is found, the packet is processed in accordance with information associated with the matching entry.

One type of lookup is a source lookup where a source address is applied to the lookup table to identify the sender of the packet for billing and accounting, source/application policing, and source learning. A second type of lookup is destination lookup where a destination address key is applied to the lookup table to determine how and where to route the packet.

As the Internet continues to increase in size and complexity, the number of entries required to be stored in the lookup tables continue to explode. One way this explosive growth may be addressed is by introducing nodes with increasingly higher capacity databases. However, given the time delays associated with new product development and the unique requirements of each network, there is a need for a more flexible and scalable solution for supporting the expected number of entries in lookup tables.

SUMMARY OF THE INVENTION

The current invention provides a scalable system and method for increasing a lookup table size without substantially compromising line rate performance and without having to redesign a chip to support an expected number of entries in the lookup table.

In one aspect of the invention, a data communication network includes a plurality of data communication switches transmitting and receiving data packets. In processing an incoming data packet, a particular switch creates a search key for the packet and transmits the search key to a plurality of lookup engines. The search key is utilized to search a lookup table associated with a lookup engine to produce a search result. The search result includes match quality data indicative of a type of match produced. In a particular aspect of the invention, the match quality data indicates an exact match, a partial match, or no match. The switch compares the match quality of at least a pair of search results and returns a search result based on the match quality.

In another particular aspect of the invention, a first search result produced by a first lookup engine is transmitted to a second lookup engine coupled to the first lookup engine. The match quality of the first search result is compared with the match quality of a second search result produced by the second lookup engine. If the match quality of the second search result is lower than the match quality of the first search result, the second search result is discarded. However, if the match quality of the second search result is higher than the match quality of the first search result, the first search result is discarded.

BRIEF DESCRIPTION OF THE DRAWINGS

These and other features, aspects and advantages of the present invention will be more fully understood when considered with respect to the following detailed description, appended claims, and accompanying drawings where:

DESCRIPTION OF THE INVENTION

Figure 1:
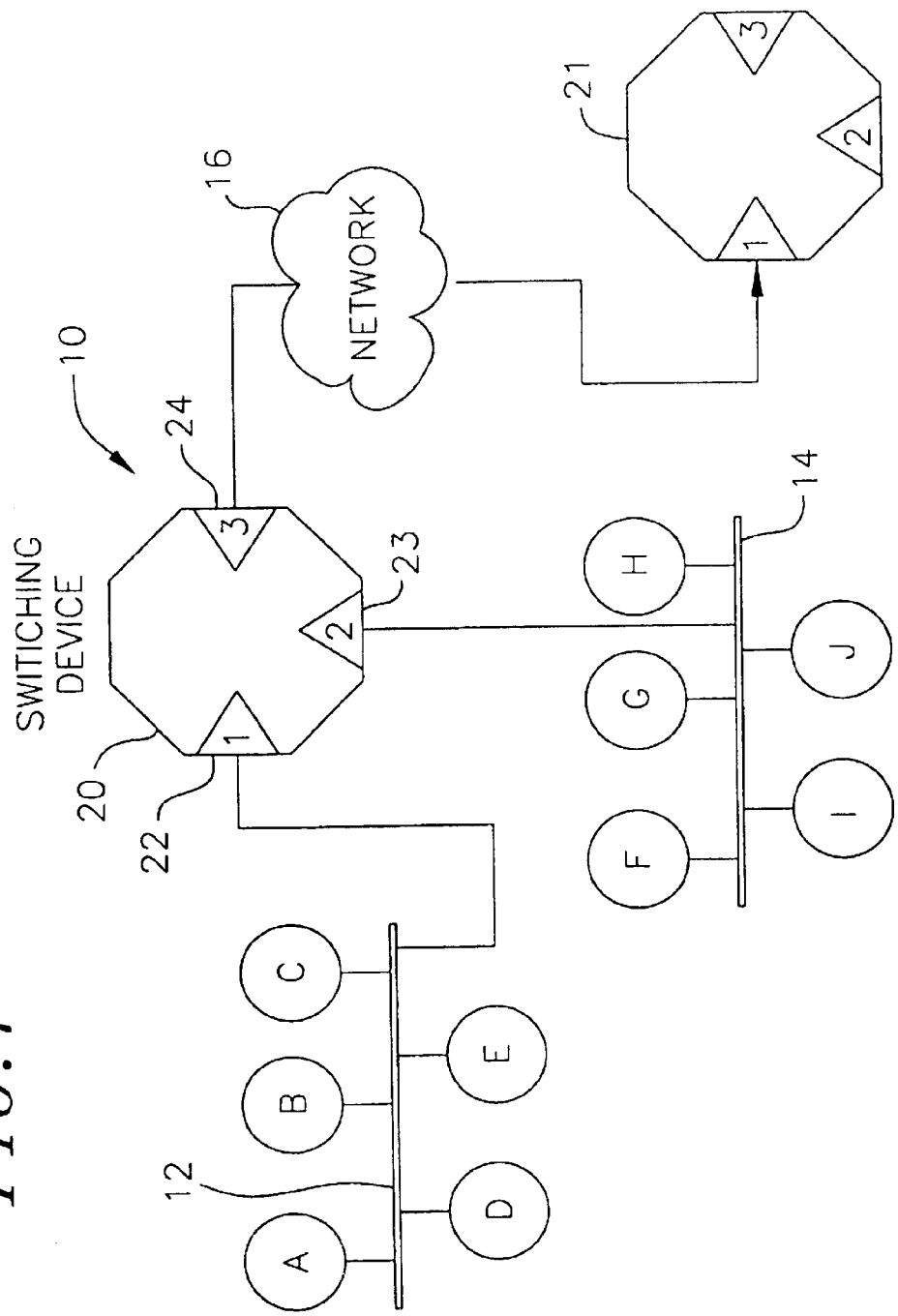
FIG. 1 is a schematic diagram of a data communications network.

FIG. 1 is a schematic diagram of a data communications network. The network includes two local segments 12, 14 and a connection to a remote network 16. Nodes, labeled as A–J, represent devices connected to the local segments. The devices are preferably network end-stations, such as, for example, personal computers, workstations, or servers, having respective network interfaces for packetized communication with other devices.

A switching device 20 includes three ports 22, 23, 24 and switches network traffic between the segments 12, 14, and the remote network 16. The remote network 16 may also include other switching devices, such as, for example, switching device 21, which then connects other segments (not shown) to the network. The switching devices 20, 21 are preferably gateway devices such as, for example, switches and/or routers and/or other like devices. The switching device 20 allows the devices on one segment to communicate with devices on other segments as well as communicate with other switching devices.

The devices communicate with each other through a communication protocol such as, for example, HTTP, TCP/IP, or SMB. These protocols allow the devices to transmit and receive network frames where each network frame preferably includes a destination address, source address, and data field. When the switching device 20 receives a frame from a device, it preferably invokes multiple lookup engines to search their respective lookup tables for the source and/or destination addresses to preferably perform source learning, billing, accounting, routing, policing functions, and the like. Additional background information on switches can be found in a number of references, such as *Fast Ethernet* (1997) by L. Quinn et al., *Computer Networks* (3$^{rd}$ Ed. 1996) by A. Tannenbaum, and *High-Speed Networking with LAN Switches* (1997) by G. Held, all of which are incorporated herein by reference.

Figure 2:
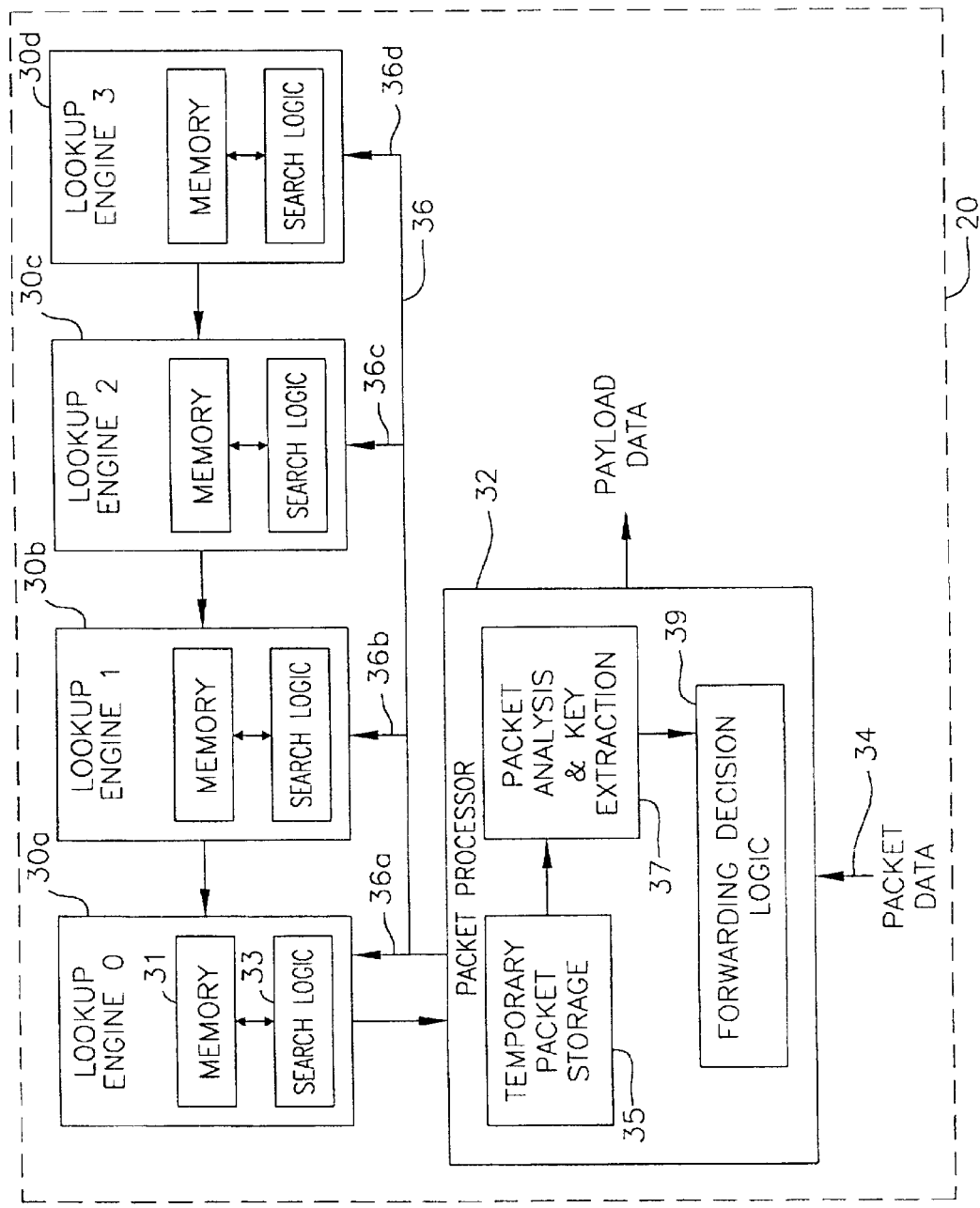
FIG. 2 is a more detailed diagram of a switching device including multiple lookup engines.

FIG. 2 is a more detailed diagram of the switching device 20. Switching device 20 preferably includes a packet processor 32 and multiple lookup engines 30a–30d where the multiple lookup engines 30a–30d preferably have identical circuit compositions.

Lookup engine 30a, which is representative of lookup engines 30a–30d, includes a memory 31 containing a lookup table (not shown) preferably storing information associated with various network addresses. The information may include, for example, routing information for forwarding the data packets and the like. The lookup table preferably contains entries that are different from the entries in other lookup tables maintained by other lookup engines. In this way, an exact match for a particular key occurs in only one lookup engine. In an alternative embodiment, a master lookup table is maintained in a single lookup engine for access by the other lookup engines.

The lookup engine 30a also includes a search logic 33 used to search the lookup table. The search logic 33 may include a wide variety of searching techniques, including binary, linear, CAM, binary radix trees, or hashing techniques. The lookup engine 30a is preferably in an ASIC (application specific integrated circuit) allowing searches of the lookup table to be performed in hardware. Alternatively, the lookup engine is a microprocessor allowing the searches to be performed in software.

The switching device 20 also includes a packet processor 32 communicating with the multiple lookup engines 30a–30d. The packet processor 32 receives a data packet via a data bus 34. Upon receipt of the data packet, the packet processor 32 preferably stores the packet in a temporary packet storage 35 until at least a final search result is returned by the lookup engines. A packet analysis and key extraction logic 37 preferably extract the source/destination address from the packet to form a search key, preferably consisting of 144 bits. One skilled in the art should recognize, however, that the search key may be of any size and include any desired information depending on the particular application. For example, the search key may contain the source/destination address, both the source and destination addresses, the source and destination addresses and additional information (such as, for example, virtual LAN information), or any one parameter or combination thereof.

The packet processor 32 preferably provides the search key to each lookup engine 30a–30d contemporaneously via bus 36. One skilled in the art should recognize, however, that the search keys need not be provided contemporaneously, but may be transmitted sequentially or in any desired order to each lookup engine. The packet processor 32 may also create and transmit a tag with the key for identifying the corresponding packet associated with the key. Upon receipt of the key, each lookup engine 30a–30d individually performs a search of its lookup table to produce a search result.

The lookup engines 30a–30d may be described as being stacked upon one another where each lookup engine provides the result of its search to a neighboring downstream lookup engine until a single final result is returned to the packet processor 32. In this regard, the lookup engine at the top of the stack 30d transmits its result to a neighboring downstream lookup engine 30c, which either validates and transmits the received result or its own result based on the quality of its match. The result preferably indicates an exact match, partial match, or no match. Although several lookup engines can return a partial match, an exact match preferably occurs in only one lookup engine.

The comparison, validation, and transmission steps are repeated by each downstream lookup engine, with the lookup engine at the bottom of the stack 30a validating and returning a final result to the packet processor 32. Preferably, only the lookup engine at the bottom of the stack 30a has its interface to the packet processor enabled.

A person skilled in the art should recognize, however, that the lookup engines need not be stacked on top of each other, and the search results need not necessarily be transmitted from an upstream lookup engine to a downstream lookup engine as long as each lookup engine sequentially transmits its search result to some other designated lookup engine.

The final result is preferably passed to a forwarding decision logic 39 which examines the result and applies a predetermined set of rules to determine whether the packet should be forwarded, and to which port or ports it should be forwarded. The forwarding decision logic may also examine the level of priority of the packet. The switching device 20 will generally forward the higher priority frames before lower priority frames.

Figure 3:
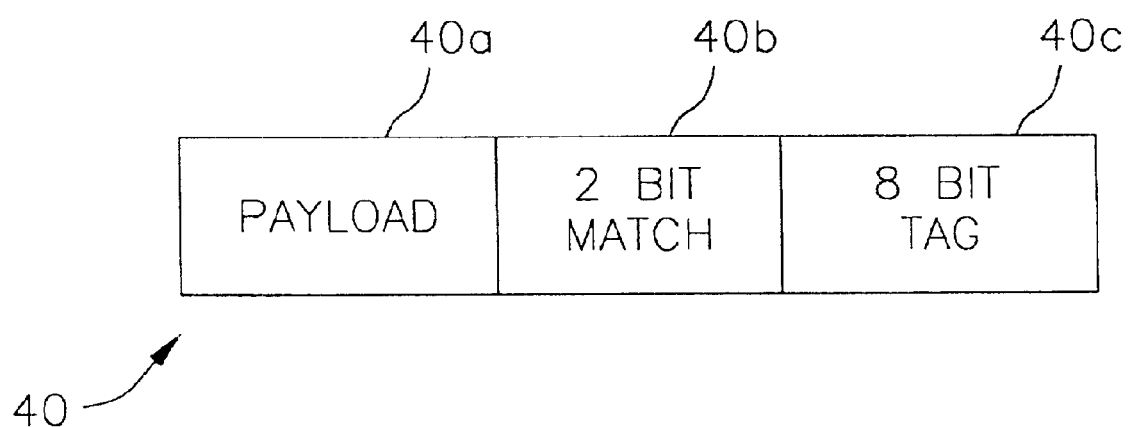
FIG. 3 illustrates a general format of a search result produced by the lookup engines of FIG. 2.

FIG. 3 illustrates a general format of a search result 40 produced by each lookup engine 30a–30d that is transmitted to a downstream lookup engine or to the packet processor 32. The search result 40 preferably includes a payload 40a, match quality 40b, and tag 40c. The payload 40a preferably consists of 176 bits supplying data of an exactly matched entry from the lookup table. Such data may include, for example, routing information for the packet such as an IP address and/or port number. Preferably, the payload 40a bits contain valid information only if a match has been found in the lookup table. The match quality 40b preferably consists of two bits containing information about the type of match resulting from the search of the lookup table. Match qualities preferably include, from the highest quality to the lowest, an exact match (match type "01"), a partial match (match type "10"), and no match (match type "00"). A partial match may reflect, for example, a partial IP address match, such as an IP subnet match.

The tag 40c which is also provided as part of the search result is preferably the same tag created by the packet processor 32 to identify the path 36a, 36b, 36c, 36d taken to transmit the search key. The tag is preferably transmitted with the search key and returned with the result of the search.

Figure 4:
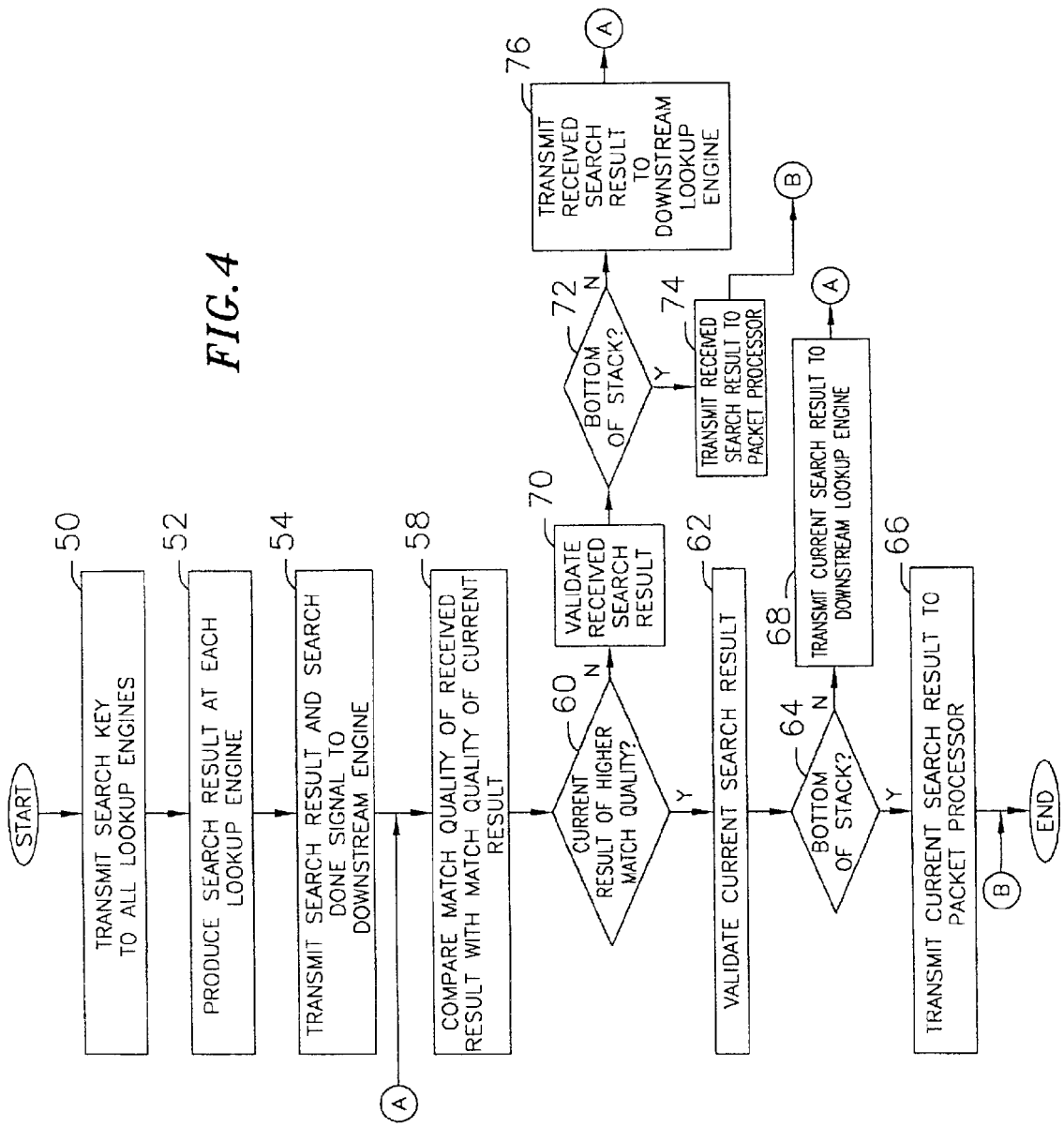
FIG. 4 is a flow diagram of a lookup process undertaken by the lookup engines of FIG. 2.

FIG. 4 is a flow diagram of a lookup process undertaken by the lookup engines of FIG. 2. The packet processor 32 transmits the search key to the lookup engines 30a–30d concurrently (50). Each lookup engine uses the search key and searches its lookup table to produce a search result (52). The lookup engine at the top of the stack 30d transmits its search result along with a search done signal to its neighboring downstream lookup engine 30c (54). The search done signal notifies the receiving lookup engine that the transmitting lookup engine has concluded its search and thus, the transmitted payload 40a, match quality 40b, and tag 40c bits are valid.

Next, the match quality of the received search result is compared with the match quality of the current search result produced by the receiving lookup engine (58) and a determination is made as to whether the current search result has a higher match quality than the match quality of the received search result (60). If the current search result has a lower match quality than the match quality of the received search result, the received search result is validated (70). Thereafter, a determination is again made as to whether the receiving lookup engine is at the bottom of the stack (72). If it is, the received search result is transmitted to the packet processor 32 (74). Otherwise, the received search result is transmitted to a next neighboring downstream lookup engine (76) and the process continues (56).

If the current search result has a higher match quality than the match quality of the received search result, the current search result is validated (62). In this way, the search result with the highest match quality is maintained during the review of the search results from all the lookup engines. Following, a determination is made as to whether the receiving lookup engine is at the bottom of the stack (64). If it is, the current search result is transmitted to the packet processor 32 (66). Otherwise, the current search result is transmitted to a next neighboring downstream lookup engine (68) and the process continues (56).

Figure 5:
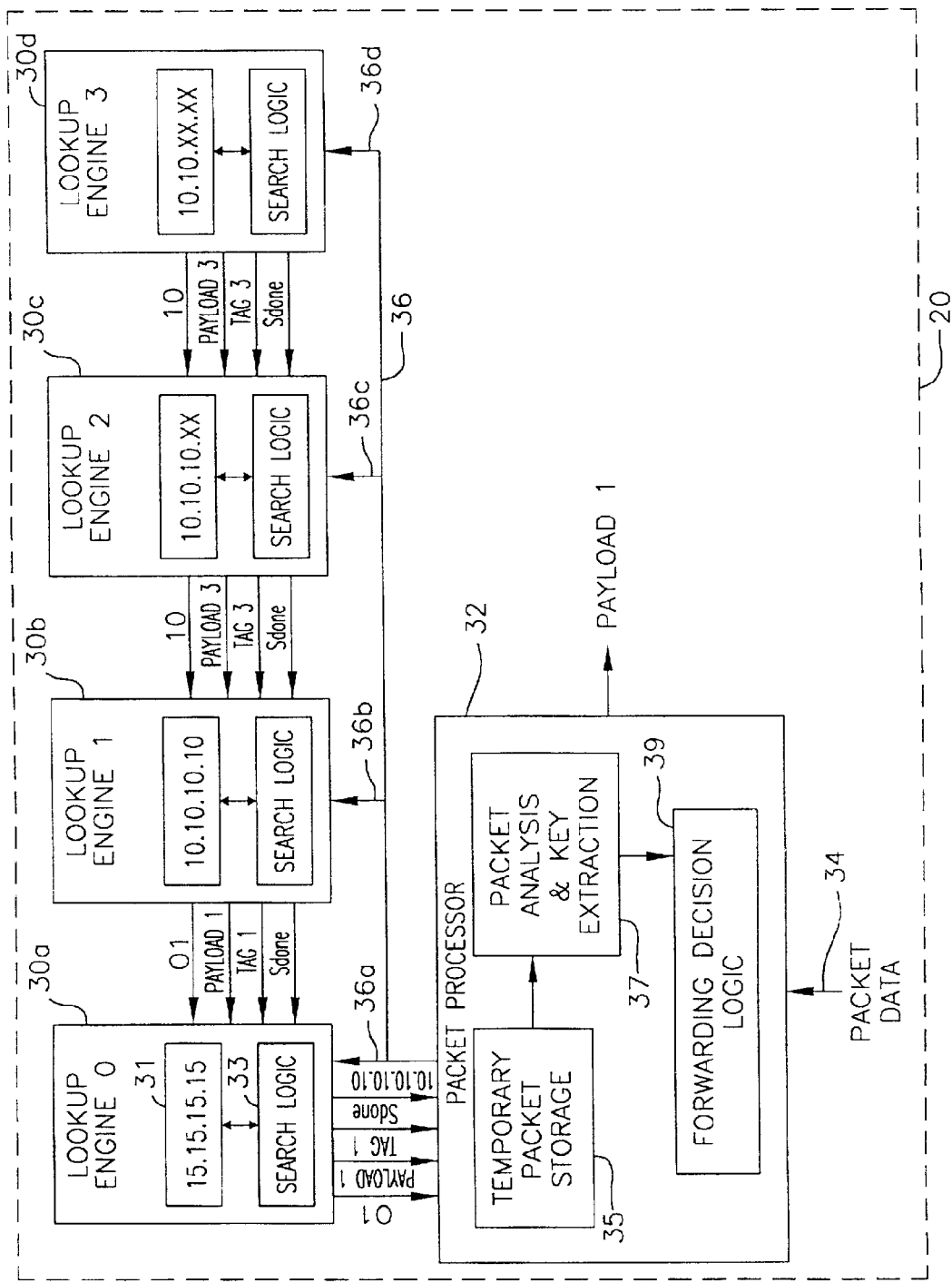
FIG. 5 is an illustration of a search performed by the lookup engines of FIG. 2 based on an exemplary key.

FIG. 5 is an illustration of a search performed by the lookup engines 30a–30d illustrated in FIG. 2 based on an exemplary key of "10.10.10.10." The key is preferably concurrently transmitted to all the lookup engines for each lookup engine to independently search its corresponding lookup table. The search results of all the lookup engines are then sequentially reviewed, preferably from the top of the stack to the bottom of the stack, or according to any other predetermined order.

In the illustration of FIG. 5, lookup engine 3 is at the top of the stack. Lookup engine 3 includes an entry in its lookup table corresponding to "10.10.XX.XX." A search of the lookup table thus produces a match quality of "10" indicative of a partial match. Lookup engine 3 transmits its payload, match quality data, and tag, along with a search done signal, to lookup engine 2.

Lookup engine 2 includes an entry in its lookup table corresponding to "10.10.10.XX." A search of its lookup table also produces a partial match with a match quality of "10." Lookup engine 2 compares its match quality with the match quality of lookup engine 3, and determines that they are of equal precedence. Thus, lookup engine 2 validates and transmits the payload, match quality data, and tag received from lookup engine 3 to lookup engine 1. In an alternative embodiment, if a later lookup engine has a better match than an earlier lookup engine, the later lookup engine payload, match quality, and tag are validated and used. Lookup engine 2 also transmits to lookup engine 1 a search done signal.

Lookup engine 1 includes an entry in its lookup table with an exact match to the search key and produces a match quality of "01." Lookup engine 1 compares its match quality with the match quality received from lookup engine 2, and determines that it has a higher match quality. Lookup engine 1 thus validates and transmits its own payload, match quality data, and tag to lookup engine 0, along with a search done signal. If lookup engine 1 did not have a better match, it would have used lookup engine 2's payload, match quality, and tag.

Lookup engine 0 includes an entry in its lookup table corresponding to "15.15.15.15." This entry does not create an exact or a partial match. Thus, lookup engine 0 produces a match quality of "00" indicating that no match was found. The match quality of lookup engine 0 is compared against the match quality received from lookup engine 1, and a determination is made that lookup engine 1 has a higher match quality. Accordingly, lookup engine 0 validates and transmits to the packet processor 32 the payload, match quality data, and tag received from lookup engine 1, along with its search done signal. The packet processor 32 thus receives a single search result with the highest match quality.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. In a data communication network including a plurality of data communication switches transmitting and receiving data packets, a method for processing a data packet received by one of the data communication switches, the method comprising the steps of:

creating a search key for the data packet;

transmitting the search key to a first lookup engine;

utilizing the search key to search a lookup table associated with the first lookup engine to produce a first search result;

transmitting the first search result to a second lookup engine coupled to the first lookup engine to produce a second search result;

comparing the first search result with the second search result for match quality; and returning one of the search results based on the match quality.

2. The method of claim 1, wherein the step of returning one of the search results comprises returning the search result with the highest match quality.

3. The method of claim 1, wherein the match quality indicates an exact match.

4. The method of claim 1, wherein the match quality indicates a partial match.

5. The method of claim 1, wherein the match quality indicates that no match was made.

6. The method of claim 1, wherein the returned one of the search results includes data from the lookup table associated with the search key.

7. The method of claim 1 further comprising validating the first search result by the second lookup engine.

8. A packet processing system including a packet processor and a plurality of lookup engines having respective data stored thereon, the lookup engines receiving a search key from the packet processor and performing a search of their respectively stored data, at least one of the lookup engines having an output for transmitting a search result to a later lookup engine in response to a search result of a prior lookup engine.

9. The system of claim 8, wherein the lookup engines concurrently receive a search key from the packet processor.

10. The system of claim 8, wherein at least one of the search results includes match quality data indicating an exact match.

11. The system of claim 8, wherein at least one of the search results includes match quality data indicating a partial match.

12. The system of claim 8, wherein at least one of the search results includes match quality data indicating that no match was made.

13. The system of claim 8, wherein the packet processor receives the one of the search results with the highest match quality.

14. The system of claim 8, wherein at least one of the search results includes a portion of the stored data associated with the search key.

15. The system of claim 8, wherein the lookup engine validates the search result of the prior lookup engine.

16. The system of claim 8, wherein the later lookup engine is a downstream lookup engine.

17. The system of claim 8, wherein the prior lookup engine is an upstream lookup engine.

18. A packet processing system including:

means for receiving a data packet;

a packet processor coupled to the means for receiving the data packet, the packet processor creating a search key for the data packet; and a plurality of lookup engines receiving the search key from the packet processor, at least one of the lookup engines utilizing the search key to search a lookup table to produce a search result, the lookup engine comparing its search result with a search result received from a prior lookup engine for determining which search result to validate.

19. The system of claim 18, wherein the lookup engines concurrently receive the search key from the packet processor.

20. The system of claim 18, wherein the prior lookup engine is an upstream lookup engine.

21. The system of claim 18, wherein the validated search result includes data from the lookup table associated with the search key.

22. The system of claim 18, wherein the lookup engine validates the search result of the prior lookup engine.

23. The system of claim 18, wherein the validated search result includes match quality data indicating an exact match.

24. The system of claim 18, wherein the validated search result includes match quality data indicating a partial match.

25. The system of claim 8, wherein the validated search result includes match quality data indicating that no match was made.

26. The system of claim 25, wherein the determination of which search result is validated is based on a comparison of match quality.

* * * * *